United States Patent
Iwasawa (10) Patent No.: US 6,998,982 B2
(45) Date of Patent: Feb. 14, 2006

(54) ANTI-THIEF SECURITY SENSOR ASSEMBLY WITH VARIABLE AMOUNT OF EMITTED INFRARED BEAM

(75) Inventor: Masashi Iwasawa, Otsu (JP)

(73) Assignee: Optex Co., Ltd., Shiga (JP)

( * ) Notice: Subject to any disclaimer, the term of this patent is extended or adjusted under 35 U.S.C. 154(b) by 0 days.

(21) Appl. No.: 10/316,663

(22) Filed: Dec. 11, 2002

(65) Prior Publication Data

US 2004/0113779 A1    Jun. 17, 2004

(51) Int. Cl.
*G08B 13/08* (2006.01)
(52) U.S. Cl. .................... 340/545.3; 340/552; 340/556
(58) Field of Classification Search ................ 340/541, 340/555, 556, 557, 511
See application file for complete search history.

(56) References Cited

U.S. PATENT DOCUMENTS

| | | | |
|---|---|---|---|
| 4,038,982 A * | 8/1977 | Burke et al. ................... 604/65 |
| 4,100,036 A * | 7/1978 | Rode et al. ..................... 205/83 |
| 4,777,653 A * | 10/1988 | Bonnerot et al. ............. 455/69 |
| 5,105,190 A * | 4/1992 | Kip et al. ................. 340/10.34 |
| 5,334,972 A | 8/1994 | Sugimoto et al. ........... 340/556 |
| 5,596,310 A | 1/1997 | Itoh ........................... 340/331 |
| 6,097,301 A * | 8/2000 | Tuttle ....................... 340/693.9 |
| 6,414,603 B1 * | 7/2002 | Yamaguchi et al. ..... 340/815.4 |

FOREIGN PATENT DOCUMENTS

| JP | 4-190497 | 7/1992 |
|---|---|---|
| JP | 6-44468 | 2/1994 |

* cited by examiner

*Primary Examiner*—Daniel Wu
*Assistant Examiner*—Son Tang (57) ABSTRACT

To provide an anti-thief security sensor assembly capable of automatically setting a projecting power in such a manner that a received beam amount of the anti-thief security sensor assembly for detecting an infrared beam interrupted to sense an intruder attains a predetermined value during an optical axis adjustment, the anti-thief security sensor assembly includes an infrared beam projecting unit (1) for emitting the infrared beam (IR), and an infrared beam receiving unit (2) for receiving the infrared beam (IR). The infrared beam receiving unit (2) has a received beam amount detector (26) for detecting the received beam amount, and a signal transmitter (28) for transmitting a received beam level display signal (L) indicative of the amount of the received beam detected to the infrared beam projecting unit (1). The infrared beam projecting unit (1) has a projecting power adjuster (15) for, on the basis of the received beam level display signal (L), adjusting a projecting power so that the amount of the received beam attains the predetermined value.

6 Claims, 7 Drawing Sheets

ANTI-THIEF SECURITY SENSOR ASSEMBLY WITH VARIABLE AMOUNT OF EMITTED INFRARED BEAM

BACKGROUND OF THE INVENTION

1. Field of the Invention

The present invention relates to an anti-thief security sensor assembly of a type wherein while an infrared beam emitted from an infrared beam projecting unit is constantly received by an infrared beam receiving unit, an alarm is generated when an unauthorized intruder traverses across the path of travel of the infrared beam from the infrared beam projecting unit towards the infrared beam receiving unit.

2. Description of the Prior Art

An anti-thief security sensor assembly enhances its ability of detecting an intruder by arranging an infrared beam projecting unit and an infrared beam receiving unit at positions spaced an appropriate distance from each other with their optical axes aligned with each other. On the other hand, the projecting power of the infrared beam projecting unit is made larger so that the intruder can be detected even if the distance between the infrared beam projecting unit and the infrared beam receiving unit becomes more remote. Due to the fact, when the distance between the infrared beam projecting unit and the infrared beam receiving unit installed is short, the amount of the beam received by the infrared beam receiving unit becomes excessive, causing an AGC (Automatic Gain Adjusting Circuit) to fail in the adjustment of the received beam level, whereby a detection signal level becomes saturated. In such case, the amount of the beam reflective on building walls adjacent the sensor assembly becomes adversely influential in detecting an incident beam amount attenuated by the interception of the intruder, or the interception of the intruder. As a result, the detection of the intruder tends to fail.

SUMMARY OF THE INVENTION

In view of the foregoing, an object of the present invention is to provide an anti-thief security sensor assembly capable of automatically adjusting a projecting power of an infrared beam projecting unit so that an amount of the beam received by an infrared beam receiving unit becomes an optimum value at which an unauthorized intruder can be detected with accuracy, during an optical axis adjustment, regardless of the installation distance between the infrared beam projecting unit and the infrared beam receiving unit.

In order to accomplish the foregoing object of the present invention, there is provided an anti-thief security sensor assembly according to a first aspect of the present invention which includes an infrared beam projecting unit for projecting an infrared beam and an infrared beam receiving unit for receiving the infrared beam projected by the infrared beam projecting unit, thereby detecting a human body or the like which intercepts the optical path of the infrared beam. The assembly also includes a mode switching device for switching over a mode between an adjustment mode for adjusting optical axes of the infrared beam projecting unit and of the infrared beam receiving unit and an operation mode for performing a security operation, wherein the infrared beam receiving unit has a received beam amount detector for detecting an amount of the beam received, and a signal transmitter for transmitting to the infrared beam projecting unit a received beam level display signal indicative of the amount of the beam received having been detected in the adjustment mode, while the infrared beam projecting unit has a projecting power adjuster for adjusting the amount of the infrared beam emitted so that the amount of the beam received attains a predetermined value, based on the received beam level display signal.

According to the first aspect described above, the projecting power adjuster of the infrared beam projecting unit receives the received beam level display signal from the infrared beam receiving unit and then adjusts the projecting power (the amount of the beam emitted) during a coarse adjustment of the optical axis so that the amount of the beam received attains the predetermined value, whereby the amount of the beam received by the infrared beam receiving unit when the coarse optical axis adjustment is finished can be set to a level near the predetermined value suitable for detecting an intruder regardless of the distance between the infrared beam projecting unit and the infrared beam receiving unit installed. Hence, a malfunction in the detection due to an excessive projecting power does not occur in the operation mode.

An anti-thief security sensor assembly according to a second aspect of the present invention includes an infrared beam projecting unit for projecting an infrared beam and an infrared beam receiving unit for receiving the infrared beam projected by the infrared beam projecting unit, thereby detecting a human body or the like which intercepts the optical path of the infrared beam, wherein the infrared beam receiving unit has a mode switching device for switching over a mode between an adjustment mode for adjusting an optical axis and an operation mode for performing a security operation, a received beam amount detector for detecting an amount of the beam received, and a request signal outputting device for transmitting a projecting power decrease request signal to the infrared beam projecting unit when the amount of the received beam detected in the adjustment mode is larger than a predetermined value, while the infrared beam projecting unit has a projecting power step decreasing device for decreasing the amount of the infrared beam emitted by a given amount each time the unit receives the projecting power decrease request signal.

According to the second aspect discussed above, during a fine adjustment of the optical axis, the request signal outputting device of the infrared beam receiving unit transmits the projecting power decrease request signal to the infrared beam projecting unit when the amount of the beam received becomes larger than the predetermined value, while the projecting power step decreasing device of the infrared beam projecting unit decreases the projecting power by the given amount when the unit receives the projecting power decrease request signal, whereby the adjustment during the fine adjustment of the optical axis becomes easy and the amount of the beam received by the infrared beam receiving unit can be set to a value near the predetermined value suitable for detecting an intruder when the coarse optical axis adjustment is finished. Hence, a malfunction (an alarm failure) in the detection of the intruder due to an excessive projecting power does not occur in the operation mode.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENT

On the basis of the drawings, a first embodiment of the present invention will be explained hereinafter.

Figure 1:
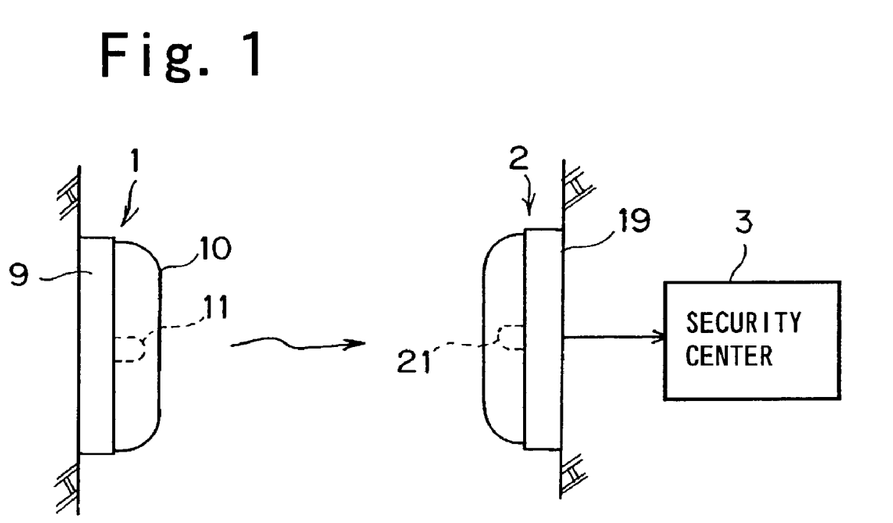
FIG. 1 is a side view showing an anti-thief security sensor assembly according to a first embodiment of the present invention.

As shown in FIG. 1, an anti-thief security sensor assembly includes an infrared beam projecting unit 1 for emitting an infrared beam IR and an infrared beam receiving unit 2 for receiving the infrared beam IR emitted from the infrared beam projecting unit 1. The infrared beam projecting unit 1 has a base 9 mounted on a wall or the like and a cover 10 for covering the base 9, while similarly the infrared beam receiving unit 2 also has a base 19 and a cover 20 for covering the base 19.

Figure 2:
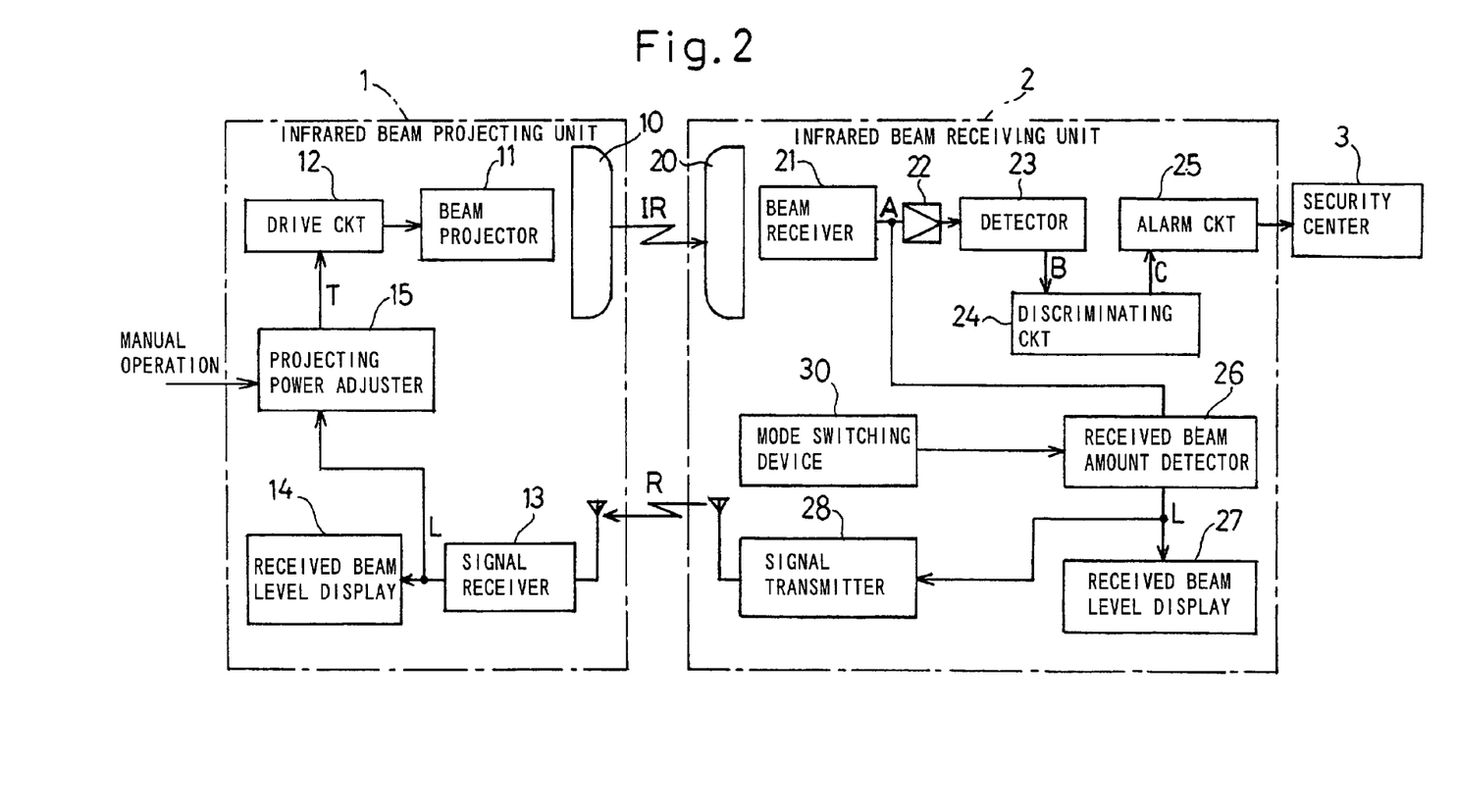
FIG. 2 is a block diagram showing a circuit configuration of the assembly according to the first embodiment.

FIG. 2 shows a block diagram of the anti-thief security sensor assembly according to the first embodiment. A beam projector 11 of the infrared beam projecting unit 1 includes a light emitting element such as an infrared light emitting diode (not shown), a transmitting-side optics such as a beam projecting lens or a reflecting mirror for forming an infrared beam projected, and an optical axis adjusting mechanism for rotating manually the light emitting element and the transmitting-side optics to adjust the optical axis of the infrared beam projecting unit 1 with respect to the infrared beam receiving unit 2, wherein the light emitting element is driven by a drive circuit to emit at a predetermined frequency the infrared beam IR formed of pulse modulated lights through the cover 10 covering the front of the infrared beam projecting unit 1.

The infrared beam projecting unit 1 is further provided with a signal receiver 13 for receiving a received beam level display signal, to be described later, by a radio signal R, a received beam level display 14 for displaying the received beam level, and a projecting power adjuster 15 for controlling the drive circuit 12 in accordance with the received beam level to adjust the amount of the beam (projecting power) emitted from the beam projector 11. The projecting power adjuster 15 is capable of being manually operated to adjust the projecting power. As described later, circuit elements are mounted on the base 9 shown in FIG. 1, which elements are covered with the cover 10.

On the other hand, a beam receiver 21 of the infrared beam receiving unit 2 includes a receiving-side optics such as a beam receiving lens or a beam collecting mirror, a light receiving element such as a photodiode, and an optical axis adjusting mechanism for adjusting the optical axis of the infrared beam receiving unit 2 with respect to the infrared beam projecting unit 1, wherein the light receiving element receives the infrared beam IR incident through the cover 20 covering the front of the infrared beam receiving unit 2 and then outputs a received beam amount signal A in accordance with the amount of the beam received. The received beam amount signal A is amplified by an amplifier 22 and then inputted into a detector 23 where a signal B is outputted in accordance with the level of the pulse modulated light after a stray light component has been removed from the pulse modulated light. The output signal B is subsequently determined by a discriminating circuit 24 as to whether the level of the signal B is equal to or less than a preset unauthorized intruder detection level. In the event that the level of the signal B is equal to or less than the detection level, a detection signal C is outputted to an alarm circuit 25 which will immediately output to a security center 3 an alarm signal warning that an unauthorized intruder has entered a guard area.

The infrared beam receiving unit 2 further has a mode switching device 30 including a manual switch for switching over a mode between an optical axis adjustment mode for adjusting the optical axes and an operation mode for performing a security operation. The cover 20 has to be removed before actuating the switch 30. When the mode is switched to the optical axis adjustment mode from the operation mode by this switch actuation, a received beam amount detector 26 is allowed to be operated, and at the same time, the security center 3 discriminates between the optical axis adjustment mode and the operation mode.

On the other hand, the received beam amount signal A is inputted into the received beam amount detector 26, from which detector 26 a received beam level display signal L in accordance with the amount of the beam received is outputted to a received beam level display 27 to display a received beam level. As described later, circuit elements are mounted on the base 19 shown in FIG. 1, which elements are covered with the cover 20.

Figure 3:
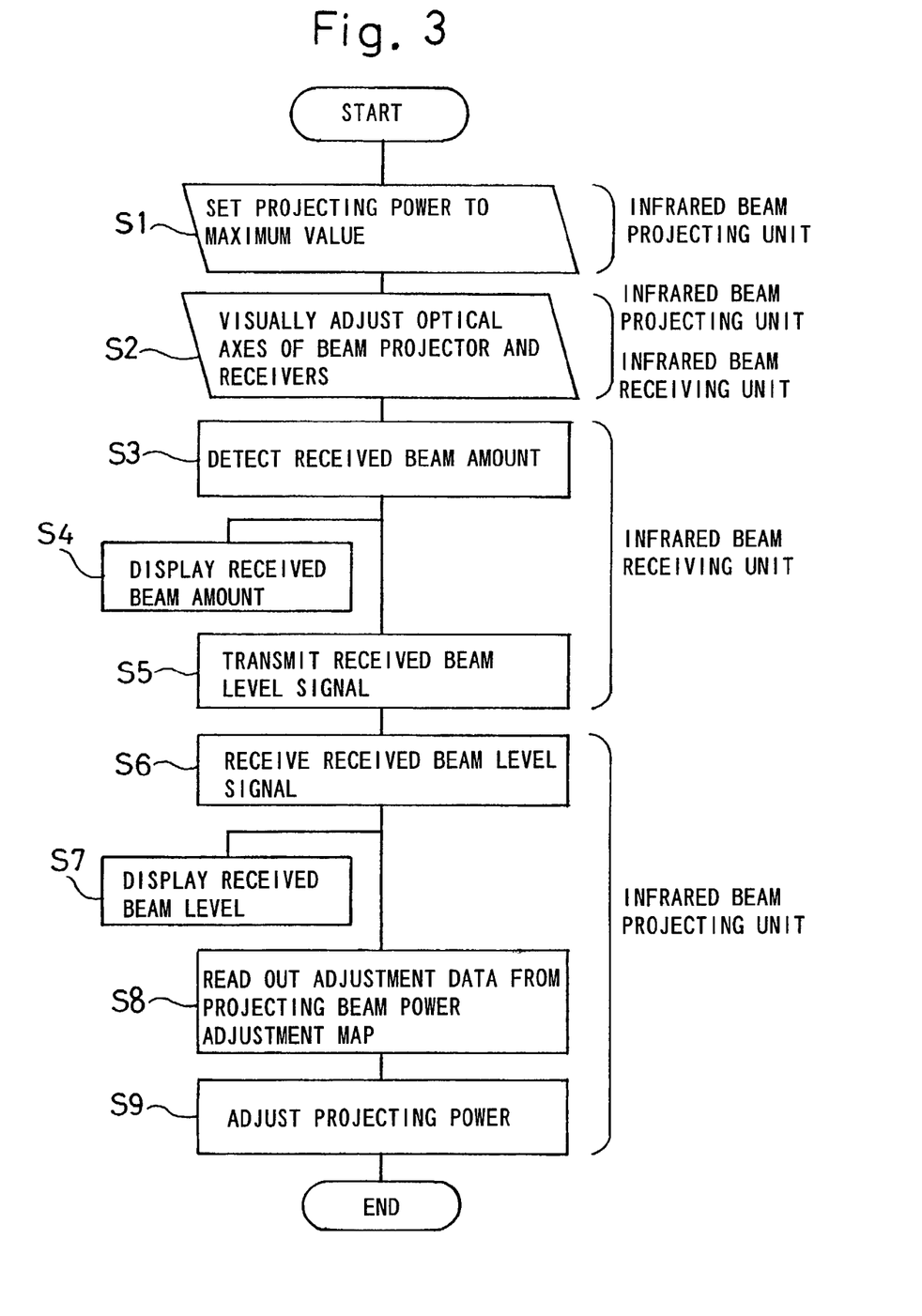
FIG. 3 is a flowchart showing an operation of an optical axis adjustment according to the first embodiment.
Figure 4:
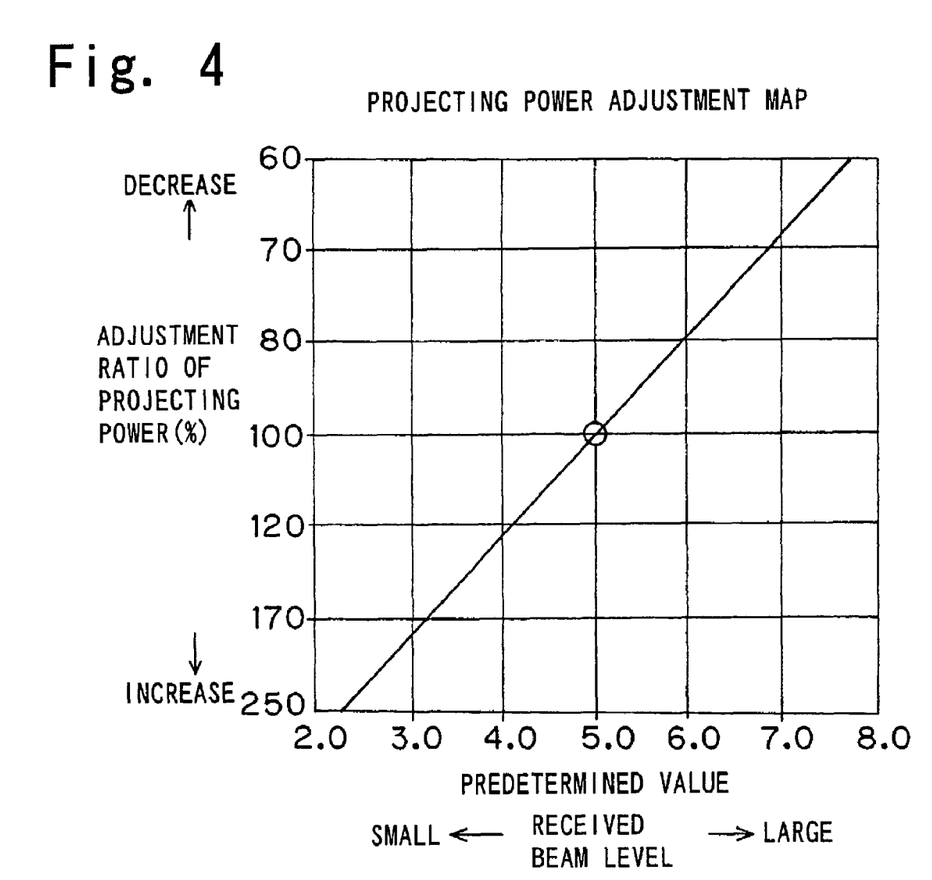
FIG. 4 is a graph showing a projecting power adjusting map of the first embodiment.

With reference to the block diagram in FIG. 2, a flowchart in FIG. 3 and a projecting power adjustment map in FIG. 4, the coarse optical axes adjustment of the beam projector 11 and of the beam receiver 21, and the adjustment operation of the projecting power of the beam projector 11 will be now explained. The beam projector 11 and the beam receiver 21 of the infrared beam receiving unit 2 are installed at respective positions forming a rectilinear guard region in which an authorized intruder is to be detected. For the adjustment of the optical axes, after removing the covers 10, 20 shown in FIG. 1, the mode switching device 30 is first switched to the optical axis adjustment mode. Then, as shown in the flowchart of FIG. 3, at step 1 (hereinafter abbreviated as S1) the projecting power adjuster 15 of the infrared beam projecting unit 1 is manually manipulated to set the projecting power of the beam projector 11 at a maximum value, and at S2, the optical axes of the beam projector 11 and of the beam receiver 21 are visually adjusted. Then, when at S3 the received beam amount detector 26 of the infrared beam receiving unit 2 detects the amount of the infrared beam IR received to output the received beam level display signal L, at S4 the received beam level is displayed on the received beam level display 27, and at S5 the received beam level display signal is, after having been coded, transmitted from a signal transmitter 28 to the infrared beam projecting unit 1 by the radio signal R.

The signal receiver 13 of the infrared beam projecting unit 1, having received the radio signal R at S6, outputs to the projecting power adjuster 15 the received beam level display signal L which has been decoded at S7 and at the same time, displays the received beam level display signal L on the received beam level display 14. The projecting power adjuster 15 has its memory circuit and stores the projecting power adjustment map shown in FIG. 4 in the memory circuit. Then, at S8 the projecting power adjuster 15 reads out an adjustment ratio (%) of the projecting power corresponding to the received beam level display signal L inputted from the map, and outputs a projecting power adjustment signal T to the drive circuit 12. The drive circuit 12 adjusts the projecting power to a value indicated by the projecting power adjustment signal T. For example, when the received beam level indicated by the received beam level display signal L is 6.0 larger than a predetermined value (5.0) for the optical axis adjustment, shown in FIG. 4, the projecting power adjustment signal T controls the drive circuit 12 to set the projecting power to 83%.

With the above-mentioned operation, performing the visual coarse adjustment of the optical axes of the beam projector 11 and beam receiver 21 causes the projecting power of the beam projector 11 to be automatically set so that the amount of the beam received by the beam receiver 21 substantially attains the predetermined value. The predetermined value is so determined that an amount of the beam received becomes optimum in the operation mode performing a security operation. Since the cover 10, 20 are usually removed during the optical axis adjustment, the amount of the beam received increases by a quantity corresponding to an amount of the infrared beam attenuated (absorbed) by the cover 10, 20. Thus, the above-mentioned predetermined value is set at a value somewhat larger than the optimum value of the received beam amount in the operation mode.

Figure 5:
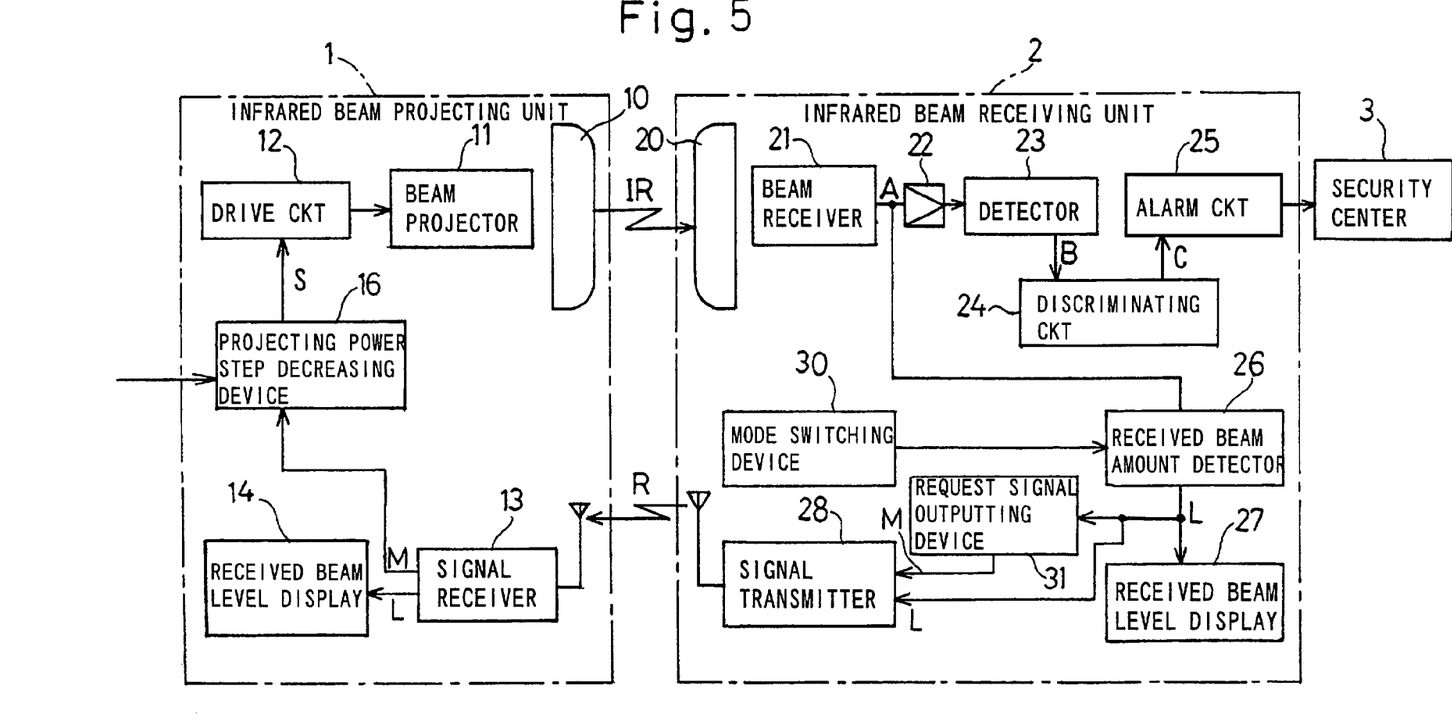
FIG. 5 is a block diagram showing a circuit configuration of an anti-thief security sensor assembly according to a second embodiment of the present invention.
Figure 6A:
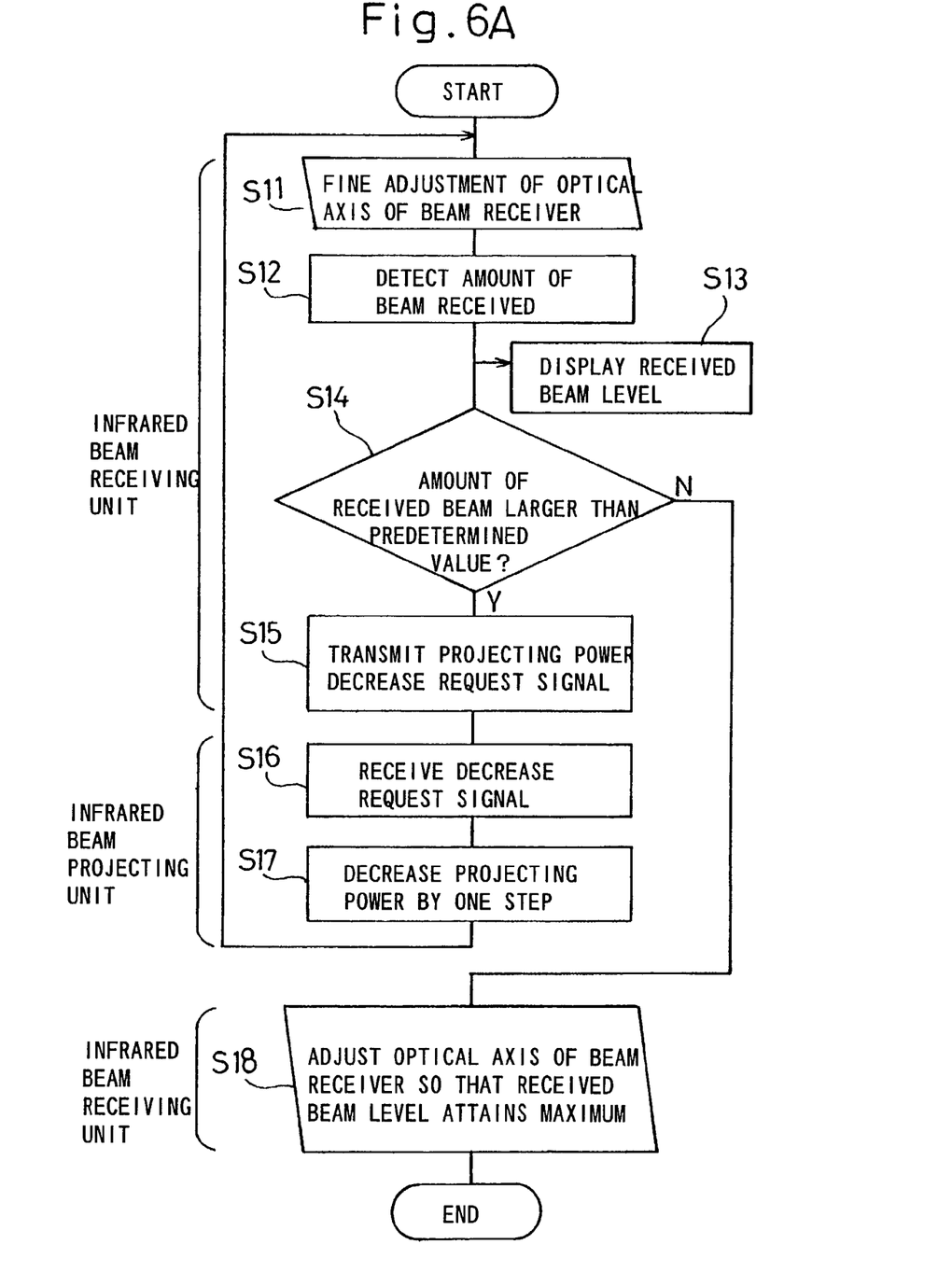
FIG. 6A is a flowchart showing an operation of an optical axis adjustment for the infrared beam receiving unit according to the second embodiment during optical axis adjustment.
Figure 6B:
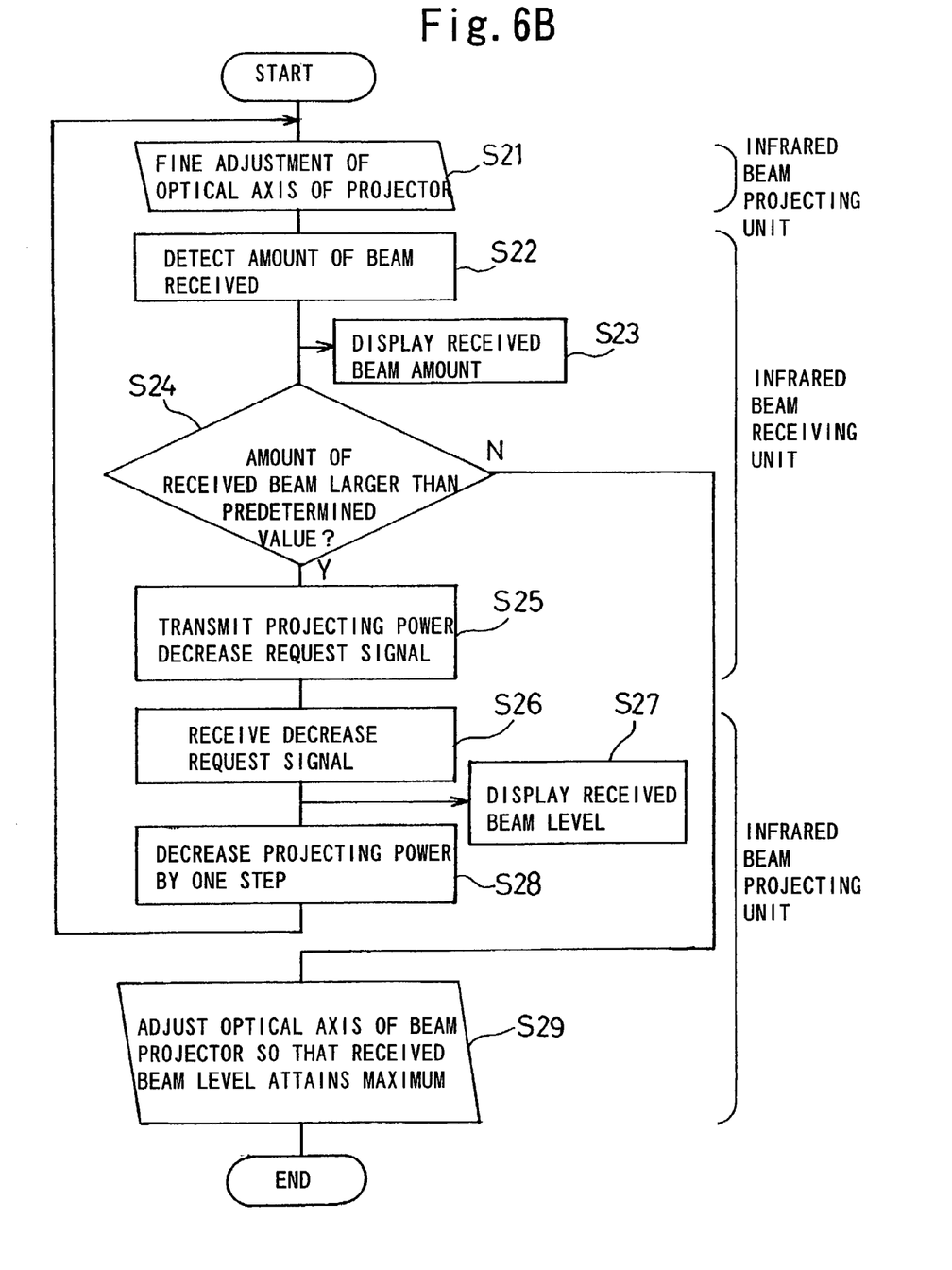
FIG. 6B is a flowchart showing the operation of the optical axis adjustment for the infrared beam projecting unit according to the second embodiment.

With reference to FIGS. 5 and 6, a second embodiment of the present invention for performing a fine optical axis adjustment will be now explained.

FIG. 5 is a block diagram of an anti-thief security sensor assembly according to the second embodiment. In FIG. 5, component parts shown therein and similar to those shown in FIG. 2 are designated by like reference numerals and, therefore, the description of those component parts is not reiterated for the sake of brevity. In FIG. 5, the infrared beam receiving unit 2 has a request signal outputting device 31 for outputting a projecting power decrease request signal M to the signal transmitter 28 when the received beam level display signal L inputted from the received beam amount detector 26 exceeds a predetermined value. On the other hand, the infrared beam projecting unit 1 has a projecting power step decreasing device 16 for outputting to the drive circuit 12 a projecting power one-step decrease signal S to decrease the projecting power by one step when the infrared beam projecting unit 1 receives the projecting power decrease request signal M from the signal receiver 13 having received the signal M.

Then, with reference to the block diagram in FIG. 5 and the flowchart in FIGS. 6A and 6B, the optical axes adjustment of the beam projector 11 of the infrared beam projecting unit 1 and the beam receiver 21 of the infrared beam receiving unit 2, and an adjustment operation of the projecting power of the beam projector 11 will be explained.

A process for the fine adjustment of the optical axis of the beam receiver 21 is as follows. At S11 in FIG. 6A, in a condition in which the optical axes of the infrared beam projecting unit 1 and the infrared beam receiving unit 2 have been coarsely adjusted in advance, rotating the optical axis of the beam receiver 21 to perform a fine adjustment causes the received beam amount detector 26 to detect the amount of the beam received to output the received beam level display signal L at S12. The received beam level display signal L is displayed on the received beam level display 27 at S13, and the amount of the beam received is compared to the predetermined value in the request signal outputting device 31 at S14. Where the amount of the beam received is larger than the predetermined value (that is, the optical axes of the infrared beam projecting unit 1 and the infrared beam receiving unit 2 are more aligned with each other), the projecting power decrease request signal M is transmitted from the signal transmitter 28 to the infrared beam projecting unit 1 at S15.

When, at S16, the projecting power decrease request signal M having been received by the signal receiver 13 is inputted into the projecting power step decreasing device 16, the projecting power step decreasing device 16 outputs to the drive circuit 12 the one-step decrease signal S to decrease the projecting power by a predetermined amount at S17, causing the drive circuit 12 to decrease the projecting power by the predetermined amount, for example, by 0.1 of the received beam level in FIG. 4. Then, the process returns to S11 and this routine is repeated until the amount of the beam received attains a value equal to or smaller than the predetermined value at S14. When the amount of the beam received attains a value equal to or smaller than the predetermined value even if the optical axis of the beam receiver 11 is rotated, since it is considered that the optical axis of the beam receiver 21 has been aligned with that of the infrared beam projecting unit 1 at a position prior to the rotation of the beam receiver 21, at S18 the optical axis of the beam receiver 21 is returned to an optical position at which the display value on the received beam level display 27 becomes maximum, ending the fine optical axis adjustment of the beam receiver 21. The amount of the beam received at this time becomes the above-mentioned predetermined value.

The following is the description of a process for the fine adjustment of the optical axis of the beam projector 21. Performing the fine adjustment of the optical axis of the beam projector 11 at S21 in FIG. 6B causes the received beam amount detector 26 of the infrared beam receiving unit 2 to detect the amount of the beam received at S22 to output the received beam level display signal L. The received beam level display signal L is displayed on the received beam level display 27 at S23, and the amount of the beam received is compared to the predetermined value in the request signal outputting device 31 at S24. When the amount of the beam received is larger than the predetermined value, the projecting power decrease request signal M together with the received beam level display signal L are transmitted from the signal transmitter 28 to the infrared beam projecting unit 1 at S25. The received beam level display signal L having been received by the signal receiver 13 at S26 is displayed on the received beam level display 14 at S27, while the projecting power decrease request signal M is inputted into the projecting power step decreasing device 16.

The projecting power step decreasing device 16, when the projecting power decrease request signal M is inputted thereinto at S28, outputs to the drive circuit 12 the projecting power one-step decrease signal S to decrease the projecting power by a predetermined amount, causing the drive circuit 12 to decrease the projecting power by one step. After the step 28, the process returns to S21 to repeat this routine in a manner similar to that of the fine adjustment of the infrared beam receiving unit 2 until the amount of the beam received attains a value equal to or smaller than the predetermined value at S24. When the amount of the beam received attains a value equal to or smaller than the predetermined value, at S29 the optical axis of the beam projector 11 is returned to an original position at which the display value on the received beam level display 14 becomes maximum, ending the fine optical axis adjustment of the beam projector 11. Accordingly, this process allows the projecting power to be automatically set to the amount of the infrared beam emitted so that the amount of the beam received attains the predetermined value.

When the optical axes adjustment of the beam receiver 21 and the beam projector 11 are finished, the mode switching device 30 is switched to the operation mode, and the covers 10 and 20 of the infrared beam projecting unit 1 and the infrared beam receiving unit 2 are mounted respectively.

The circuit elements of the infrared beam projecting unit 1 (the beam projector 11, the drive circuit 12, the signal receiver 13, the beam receiving level display 14, the projecting power step decreasing device 16) are installed on the base 9 in FIG. 1, while the circuit elements of the infrared beam receiving unit 2 (the beam receiver 21, the amplifier 22, the detector 23, the discriminating circuit 24, the alarm circuit 25, the received amount detector 26, the received beam level display 27, the signal transmitter 28, the mode switching device 30, the request signal outputting device 31) are installed on the base 19 in FIG. 1.

Further, the first embodiment and second embodiment may be used in combination or individual.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. An anti-thief security sensor assembly which comprises:
   a radiation beam projecting unit for projecting a radiation beam; and
   a radiation beam receiving unit for receiving the radiation beam projected by the radiation beam projecting unit and operable to detect a human body in the event that the human body traverses the optical path of travel of the radiation beam from the radiation beam projecting unit towards the radiation beam receiving unit;
   said anti-thief security sensor assembly further comprising a mode switching device for switching a mode between an adjustment mode for adjusting an optical axis and an operation mode for performing a security operation,
   said radiation beam receiving unit comprising a received beam amount detector for detecting an amount of the radiation beam received and a request signal outputting device for, when the amount of the received radiation beam detected in the adjustment mode is larger than a predetermined value, which is larger than an optimum value of the received radiation beam amount in the operation mode, transmitting a projecting power decrease request signal to the radiation beam projecting unit with a wireless transmitter;
   said radiation beam projecting unit comprising a projecting power step decreasing device for decreasing an amount of the radiation beam emitted by a predetermined amount each time the radiation beam projecting unit receives the projecting power decrease request signal with a receiver unit, and
   means for adjusting an optical axis between the radiation beam projecting unit and the radiation beam receiving unit.

2. The security sensor assembly of claim 1 wherein the mode switching device including a switch unit for setting the radiation beam projecting unit to one of an optical axis adjusting mode and a security operation mode and providing an indication of the mode to a control security center.

3. The security sensor assembly of claim 2 further including a cover member for extending over the switch unit which is removed for performing an optical axis adjusting mode.

4. The security sensor assembly of claim 1 further including a projecting power adjustment table stored in a memory to provide the predetermined value.

5. The security sensor assembly of claim 4 wherein the projecting power adjuster unit decreases the strength of the radiation beam by a set amount when the radiation beam is above the predetermined value and operation of the means for adjusting the optical axis is repeated for an alignment adjustment until the radiation beam is equal to or less than the predetermined value.

6. A method of aligning and setting the power of a radiation beam between a radiation beam projecting unit and a remote radiation beam receiving unit in a security sensor assembly, comprising the steps of:
   switching the radiation beam projecting unit to an optical axis adjusting mode;
   aligning the optical axis between the radiation beam projecting unit and the remote radiation beam receiving unit;
   automatically sending a signal representative of the power level of the received radiation beam;
   automatically comparing the power level of the received radiation beam with a predetermined stored value;
   automatically adjusting the output power to a predetermined level to optimize the detecting ability of the security sensor assembly including (a) sending a power decrease signal when the received power level is above the predetermined stored value, (b) decreasing the power level of the radiation beam by a set amount upon receipt of the power signal and (c) automatically repeating steps (a) and (b) until the radiation beam attains the predetermined stored value; and
   switching the security sensor assembly to a security operation mode.

* * * * *